Sept. 15, 1953  G. A. MONTOOTH  2,652,134
SPRING CLUTCH AND BRAKE
Original Filed March 4, 1949  3 Sheets-Sheet 1
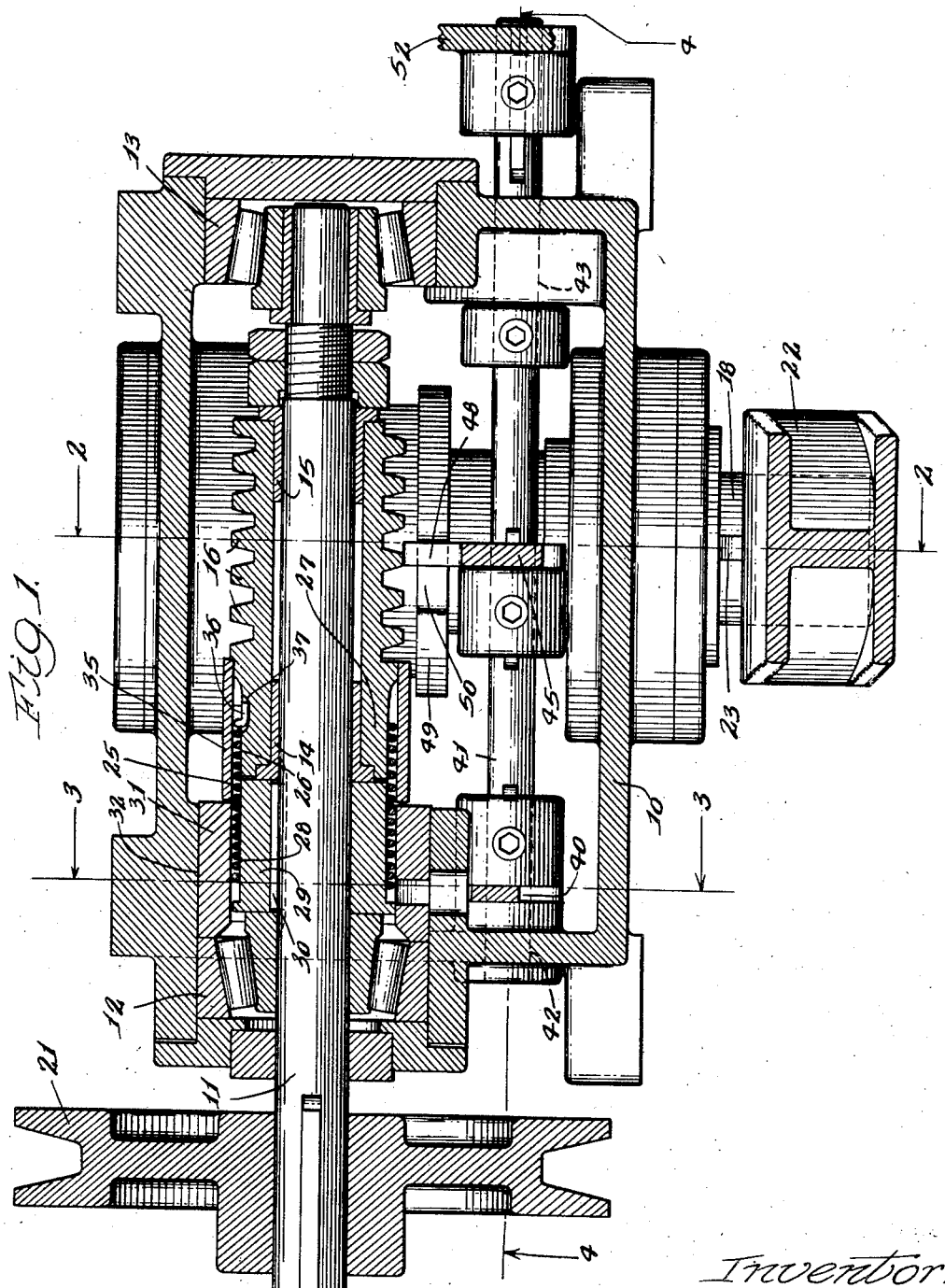
Inventor.
George A. Montooth
By Schroeder, Merriam,
Hofgren & Brady
Attys.

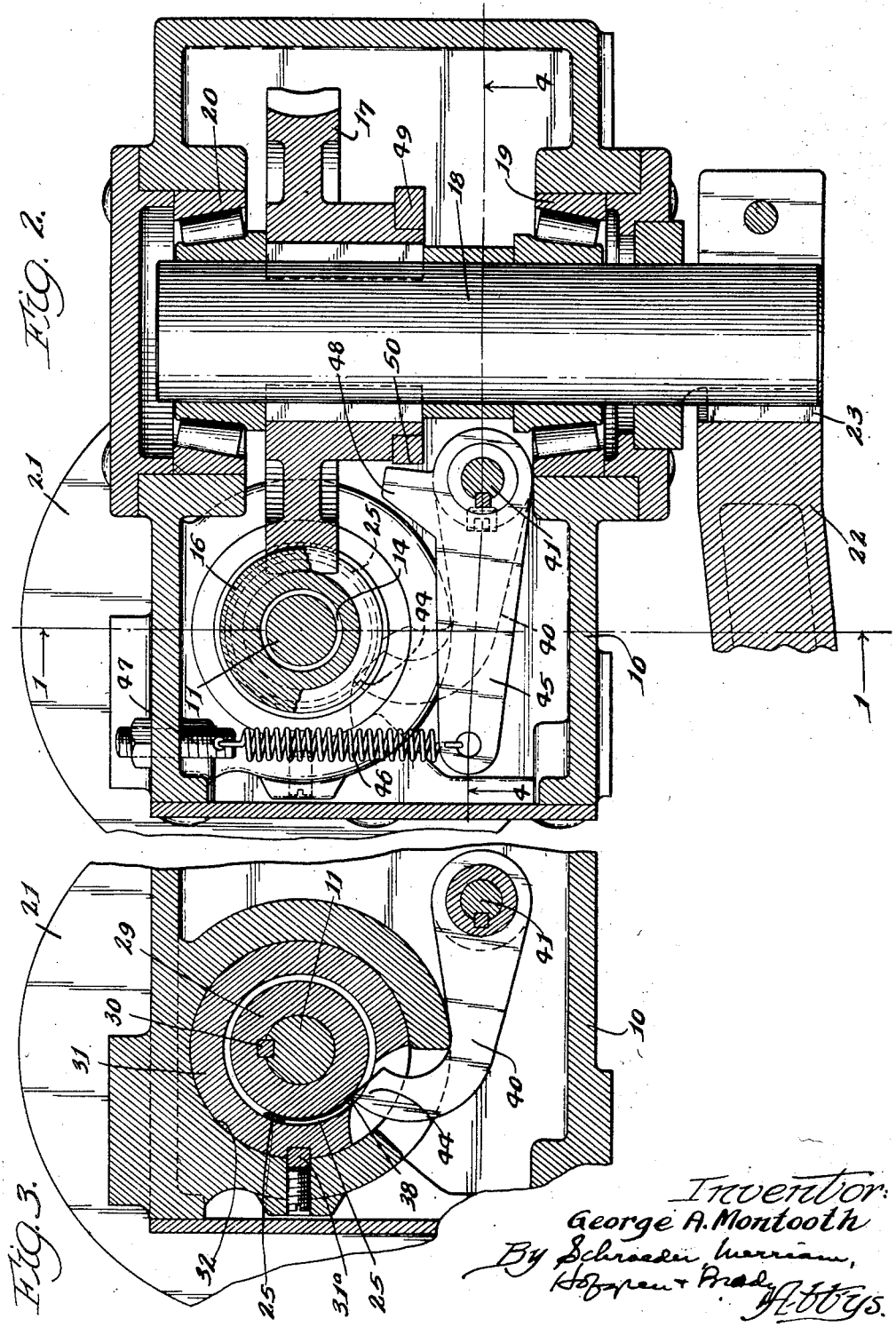

Sept. 15, 1953  G. A. MONTOOTH  2,652,134
SPRING CLUTCH AND BRAKE
Original Filed March 4, 1949  3 Sheets-Sheet 3

Inventor:
George A. Montooth
By Schroeder, Merriam,
Hofgren & Brady Attys.

Patented Sept. 15, 1953

2,652,134

UNITED STATES PATENT OFFICE 2,652,134

SPRING CLUTCH AND BRAKE

George A. Montooth, Long Beach, Calif., assignor to The Brunswick-Balke-Collender Company, a corporation of Delaware Original application March 4, 1949, Serial No. 79,691. Divided and this application February 10, 1950, Serial No. 143,469

5 Claims. (Cl. 192—14)

1

This invention relates to a gear box, and more particularly to a gear box incorporating a clutch mechanism. This invention is a division of my co-pending application entitled "Bowling Pin Setters," Ser. No. 79,691, filed March 4, 1949.

It is the general object of the invention to provide a new and improved gear box which incorporates a one-revolution clutch and speed reducing means.

Other objects of the invention are to provide a gear box having a drive member adapted to be continuously rotated, a driven member adapted to be rotated by said drive member, and a clutch comprising a coiled spring surrounding cylindrical clutch faces on both of said members and adapted grippingly to engage said clutch faces to couple said members to provide for predetermined rotational movement of said driven member; to provide a clutch coupling element comprising a coiled spring having one end affixed to the driving member and having the other end engageable by an arm to hold said spring out of gripping engagement with the clutch faces of the driving and driven members, together with means for moving said arm out of engagement with the spring to permit the spring grippingly to engage the clutch faces to couple the members; to provide a tubular sleeve surrounding the spring to provide braking action; and to provide a rockable control shaft having a first arm for engaging the spring, a second arm for rocking said shaft to move the first arm into engagement with the spring to disengage the clutch, and means for moving the first arm out of engagement with the spring to engage the clutch.

Further objects and advantages will become readily apparent from the following detailed description taken in consideration with the accompanying drawings, in which:

Fig. 1 is a vertical section through the gear box mechanism along the line 1—1 of Fig. 2;

Fig. 2 is a vertical section along the line 2—2 of Fig. 1;

Fig. 3 is a vertical section along the line 3—3 of Fig. 1; and

Figure 4:
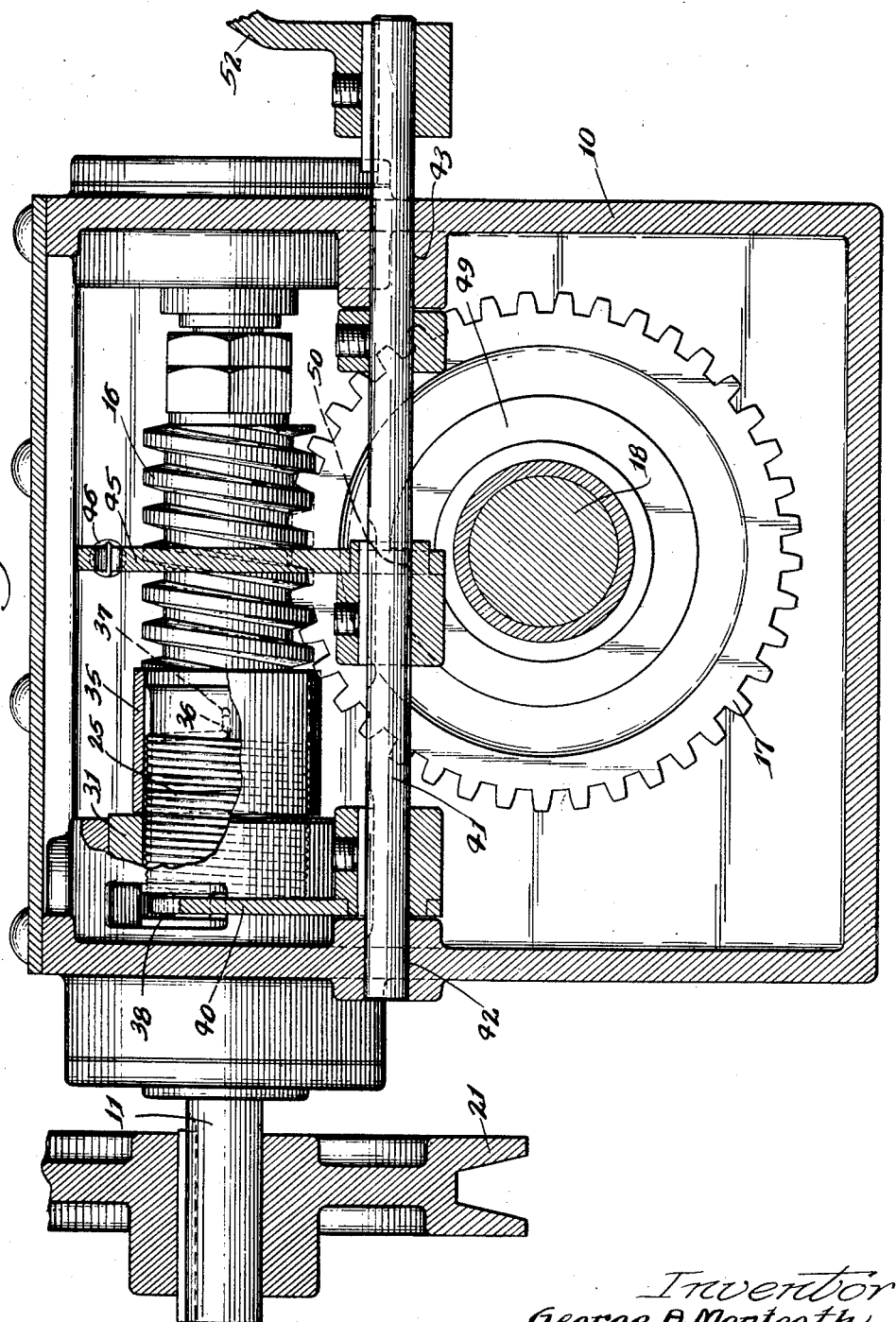
Fig. 4 is a vertical section along the line 4—4 of Fig. 1 and Fig. 2.

While I have illustrated in the drawings and shall herein describe in detail a preferred embodiment of the invention, it is to be understood that the invention is not limited to the particular form of the invention shown. The scope of the invention will be pointed out in the claims.

The gear box is housed within a casing 10. As

2 illustrated herein, an input or drive shaft 11 is rotatably supported in anti-friction bearings 12 and 13. Loosely supported on the shaft by means of bushings 14 and 15 is a worm 16. This worm meshes with a worm gear 17 which is keyed to an output or driven shaft 18 which is rotatably supported in the casing 10 by anti-friction bearings 19 and 20 on an axis transverse to that of the shaft 11. The outer end of the shaft 11 has keyed thereto a pulley 21 which may be coupled by a belt to a continuously driven motor. The outer end of the shaft 18 carries a crank 22 which is periodically given a single rotation by engagement of a clutch mechanism which comprises a coiled clutch spring 25, a portion of which circumscribes a cylindrical clutch face 26 on an extension 27 on the worm 16 and the remainder of which circumscribes a cylindrical clutch face 28 on an annular bushing 29 which is secured to the shaft 11 as by a key 30. Externally the spring is surrounded in part by annular member 31 fixed in a bore 32 in the casing 10 (by a key 31a (Fig. 3)) and in part by a tubular member 35 fixed to and rotatable with the worm. One end 36 of the clutch spring 25 is bent radially inward and then turned at right angles to the coil and anchored in a slot 37 cut in the adjacent portion of the worm (Figs. 1, 2 and 4). The clutch spring 25 is normally coiled so as to wrap around and engage the clutch surfaces 26 and 28 of the worm portion 27 and the bushing 29 respectively, and thereby form a clutch between said parts which causes the worm to rotate with the shaft 11. It is possible to release the clutch by stopping rotation of the opposite end 38 of the clutch spring (Figs. 3 and 4), thus causing the spring to unwind from driving contact with the parts 27 and 29. A braking action for the worm is obtained by the expansion of the spring into engagement with the interior of the parts 31 and 35, due to the inertia of the worm, and parts driven thereby.

Generally, it is desirable to have the clutch normally disengaged so that the motor which is coupled to the pulley 21 may remain in operation. To accomplish this, a control arm 40 is secured to a horizontally extending control shaft 41 which is rotatably journalled in the end walls of the casing 10 in bores 42 and 43. The arm 40 has an upwardly extending portion 44 which is normally positioned in the path of the end 38 of the clutch spring 25 to unwrap it from the parts 29 and 27. The control shaft 41 carries a second arm 45 and a coil spring 46 is connected intermediate the free end of the arm 45 and an adjustable screw device 47 supported in the casing wall to maintain the arm 40 in the position shown in Figs. 2 and 3.

The arm 45 has a projecting portion 48 (Figs. 1 and 2) which is engageable by a cam 49 secured to the worm wheel 17. As shown best in Fig. 4, this cam is generally circular with the exception of a depression or notch at 50 into which the projection 48 extends when the portion 44 of the arm 40 engages the clutch spring end 38 to disengage the clutch.

As the control shaft 41 is rocked in a counter-clockwise direction as illustrated in Figs. 2 and 3, as by pulling on a cord connected to an arm 52 on the outer end of the control shaft, and with the shaft 11 rotating in a counter-clockwise direction, the portion 44 of the arm 40 is momentarily withdrawn from its position in front of the end 38 of the clutch spring. Due to its normal tendency to contract, the clutch spring then grippingly engages the parts 26 and 28 and drives the worm 16 with the shaft 11. As soon as the worm rotates sufficiently to rotate the cam 49 in a clockwise direction, as shown in Fig. 4, to move the circular periphery of the cam under the projection 48 of arm 45, the cam 49 serves to maintain the arm portion 44 out of engagement with the end 38 of the clutch spring. The clutch then remains engaged until the driven shaft 18 has completed one revolution, whereupon the projection 48 re-enters the notch 50 in the cam 49 and permits the spring 46 to rock the control shaft 41 in a clockwise direction as shown in Figs. 2 and 3, to position the arm portion 44 in the path of the rotating end 38 of the clutch spring. The end 38 of the spring 25 is therefore stopped the next time it comes around and the clutch spring is released to disengage the clutch and apply the brake.

I claim:

1. A gear box comprising a casing, a drive shaft extending transversely of and rotatably mounted within said casing and having one end extending therefrom, a driven shaft rotatably mounted in said casing on an axis transverse to that of the drive shaft and having one end extending from said casing, a worm wheel on said driven shaft, a worm rotatably mounted on said drive shaft and engaging said worm wheel, said worm having a cylindrical surface at one end thereof forming a clutch face, a tubular member keyed to said drive shaft adjacent the worm and having a cylindrical surface of the same diameter as that of the worm and forming another clutch face, a coil clutch spring device surrounding said clutch faces and adapted when contracted thereagainst to couple the worm to the drive shaft, means anchoring one end of said clutch spring device to the worm, said clutch spring device being so coiled as normally to contract against said clutch faces to drive the worm, the other end of the clutch spring device being engageable to unwrap the device from the clutch faces, a pivoted dog supported in said casing and movable into the path of the other end of the clutch spring device to disengage the clutch upon completion of a single revolution of the driven shaft comprising a cam on the driven shaft, a follower for the cam connected to the dog, the cam having a depression into which the follower moves upon the completion of each rotation of the driven shaft, and means for moving said dog to engage the clutch.

2. A gear box comprising a casing, a drive shaft rotatably mounted within said casing and having one end extending therefrom, a driven shaft rotatably mounted in said casing on an axis transverse to that of the drive shaft and having one end extending from said casing, a worm wheel on said driven shaft, a worm rotatably mounted on said drive shaft and engaging said worm wheel, said worm having a cylindrical surface at one end thereof forming a clutch face, a tubular member keyed to said drive shaft adjacent the worm and having a cylindrical surface of the same diameter as that on the worm and forming another clutch face, a coil clutch spring device surrounding said clutch faces and adapted when contracted thereagainst to couple the worm to the drive shaft, means anchoring one end of said clutch spring device to the worm, said clutch spring device being so coiled as normally to contract against said clutch faces to drive the worm, the other end of the clutch spring device being engageable to unwrap the device from the clutch faces, a pivoted dog supported in said casing and movable into the path of the other end of the clutch spring device to disengage the clutch, and means including a cam on the driven shaft for operating said dog to disengage the clutch upon completion of a single revolution of the driven shaft.

3. A gear box comprising a casing, a drive shaft rotatably mounted within said casing and having one end extending therefrom, a driven shaft rotatably mounted in said casing and having one end extending therefrom, a first gear on said driven shaft, a second gear rotatably mounted on said drive shaft and engaging said first gear, said second gear having a cylindrical surface at one end thereof forming a clutch face, a tubular member keyed to said drive shaft adjacent the second gear and having a cylindrical surface of the same diameter as that of the second gear and forming another clutch face, a coil clutch spring device surrounding said clutch faces and adapted when contracted thereagainst to connect the second gear to the drive shaft, means anchoring one end of said clutch spring device to the second gear, said clutch spring device being so coiled as normally to contract against said clutch faces to drive the second gear, the other end of the clutch spring device being engageable to unwrap the device from the clutch faces, a pivoted dog supported in said casing and movable into the path of the other end of the clutch spring device to disengage the clutch, and driven shaft controlled means for operating said dog to disengage the clutch upon completion of a single revolution of the driven shaft.

4. A gear box comprising in combination, a drive shaft having a cylindrical clutch face, said shaft being adapted to be continuously rotated, a driven shaft, a worm wheel on said driven shaft, a worm rotatably mounted on said drive shaft and having a cylindrical clutch face adjacent to and coaxial with and of the same diameter as the clutch face on said drive shaft, said worm engaging said worm wheel, a coiled spring surrounding adjacent portions of both said faces, said spring having one end affixed to said worm and said spring being so coiled as normally to contract to grip said clutch faces, a rockably mounted control shaft, a first arm on said control shaft for engaging the other end of said spring to hold said spring out of gripping engagement with said clutch faces, a cam on the driven shaft, a second arm on the control shaft having a follower for the cam, the cam having a depression into which the follower moves upon the completion of each revolution of the driven shaft, a spring connected to said second arm for rocking the control shaft to move the follower into said depression, and means on said control shaft for moving said first arm out of engagement with the end of said spring to engage the clutch.

5. A gear box comprising in combination, a drive shaft having a cylindrical clutch face, said shaft being adapted to be continuously rotated, a driven shaft, a first gear on said driven shaft, a second gear rotatably mounted on said drive shaft and having a cylindrical clutch face adjacent to and coaxial with and of the same diameter as the clutch face on said drive shaft, said second gear engaging said first gear, a coil spring surrounding adjacent portions of both of said faces, said spring having one end affixed to said second gear and said spring being so coiled as normally to contract and grip said clutch faces, a pivoted arm for engaging the free end of said spring, means normally holding said arm in engagement with the free end of said spring to expand said spring out of gripping engagement with said clutch faces, means for releasing said arm holding means to permit said spring grippingly to engage said clutch faces to couple said drive shaft and second gear, means actuated by a predetermined rotational movement of said driven shaft for allowing said arm holding means to return said arm into position to engage said spring to uncouple said drive shaft and second gear, and a stationary tubular sleeve surrounding said spring, the inner surface of said sleeve engaging said spring upon expansion thereof to provide a braking action for the driven shaft.

GEORGE A. MONTOOTH.

References Cited in the file of this patent

UNITED STATES PATENTS

| Number | Name | Date |
|---|---|---|
| 784,653 | Beyer | Mar. 14, 1905 |
| 1,477,222 | Hopkins | Dec. 11, 1923 |
| 1,870,226 | Bishop | Aug. 9, 1932 |
| 1,968,155 | Litchfield | July 31, 1934 |
| 2,243,042 | Stahl | May 20, 1941 |
| 2,475,432 | Marihart | July 5, 1949 |